(12) United States Patent
Blank

(10) Patent No.: US 11,092,415 B2
(45) Date of Patent: Aug. 17, 2021

(54) METHOD OF MANUFACTURING A CARTRIDGE CASE

(71) Applicant: US Strategic LLC, St. Louis, MO (US)

(72) Inventor: Michael H. Blank, Chesterfield, MO (US)

( * ) Notice: Subject to any disclaimer, the term of this patent is extended or adjusted under 35 U.S.C. 154(b) by 0 days.

(21) Appl. No.: 16/689,525

(22) Filed: Nov. 20, 2019

(65) Prior Publication Data

US 2021/0148687 A1 May 20, 2021

(51) Int. Cl.
*F42B 33/14* (2006.01)
*F42B 5/26* (2006.01)
*B23K 26/362* (2014.01)
*B23K 101/00* (2006.01)
*B21K 21/04* (2006.01)

(52) U.S. Cl.
CPC ............ *F42B 33/14* (2013.01); *B23K 26/362* (2013.01); *F42B 5/26* (2013.01); *B21K 21/04* (2013.01); *B23K 2101/007* (2018.08)

(58) Field of Classification Search
CPC .......... F42B 33/14; F42B 5/26; B23K 26/362; B23K 2101/007; B21K 21/04
USPC ...................... 86/18, 12, 19.5, 19.6; 102/430
See application file for complete search history.

(56) References Cited

U.S. PATENT DOCUMENTS

| | | | | |
|---|---|---|---|---|
| 3,408,718 | A * | 11/1968 | Weaver | B21D 51/54 86/19.5 |
| 5,485,789 | A * | 1/1996 | Collier | F42B 5/025 102/501 |
| 5,698,816 | A * | 12/1997 | Roxby | F42B 5/025 102/439 |
| 6,209,459 | B1 * | 4/2001 | Kaufman | F42B 5/025 102/439 |
| 6,810,816 | B2 * | 11/2004 | Rennard | F42B 5/025 102/430 |
| 7,143,697 | B2 * | 12/2006 | Mace | F42B 5/02 102/430 |
| 7,823,495 | B2 * | 11/2010 | Martini Filho | F42B 5/025 86/1.1 |
| 9,052,176 | B1 * | 6/2015 | Stefano | F42B 33/14 |
| 9,086,261 | B2 * | 7/2015 | Harvey | F42B 33/00 |
| 9,329,009 | B1 * | 5/2016 | Moore | F42B 30/02 |
| 10,322,590 | B2 * | 6/2019 | Raemy | F42B 5/025 |
| 10,466,019 | B1 * | 11/2019 | Arnon | F42B 5/025 |
| 2003/0217665 | A1 * | 11/2003 | Rennard | F42B 35/00 102/430 |
| 2004/0027630 | A1 * | 2/2004 | Lizotte | B23K 26/04 359/15 |
| 2005/0005806 | A1 * | 1/2005 | Mace | F42B 5/025 102/430 |

(Continued)

*Primary Examiner* — John Cooper
(74) *Attorney, Agent, or Firm* — Charles McCloskey

(57) ABSTRACT

A method of manufacturing cartridge cases, wherein the method comprises fabricating a plurality of substantially identically sized and shaped unmarked inventory cases suitable for use in manufacturing a plurality of different caliber cartridges and selecting a number of the plurality of the unmarked inventory cases to be used to manufacturing a selected one of the plurality different caliber cartridges. The method further comprises inscribing, via a laser inscription device, the selected number of unmarked inventory cases to identify at least the selected one of the plurality of different caliber cartridges the selected number of unmarked inventory cases are to be used to manufacture.

7 Claims, 4 Drawing Sheets

(56) References Cited

U.S. PATENT DOCUMENTS

2008/0184873 A1\* 8/2008 Martini Filho ......... F42B 5/025
                                                                     86/1.1
2011/0214583 A1\* 9/2011 Dutch ..................... F42B 5/025
                                                                    102/464

\* cited by examiner

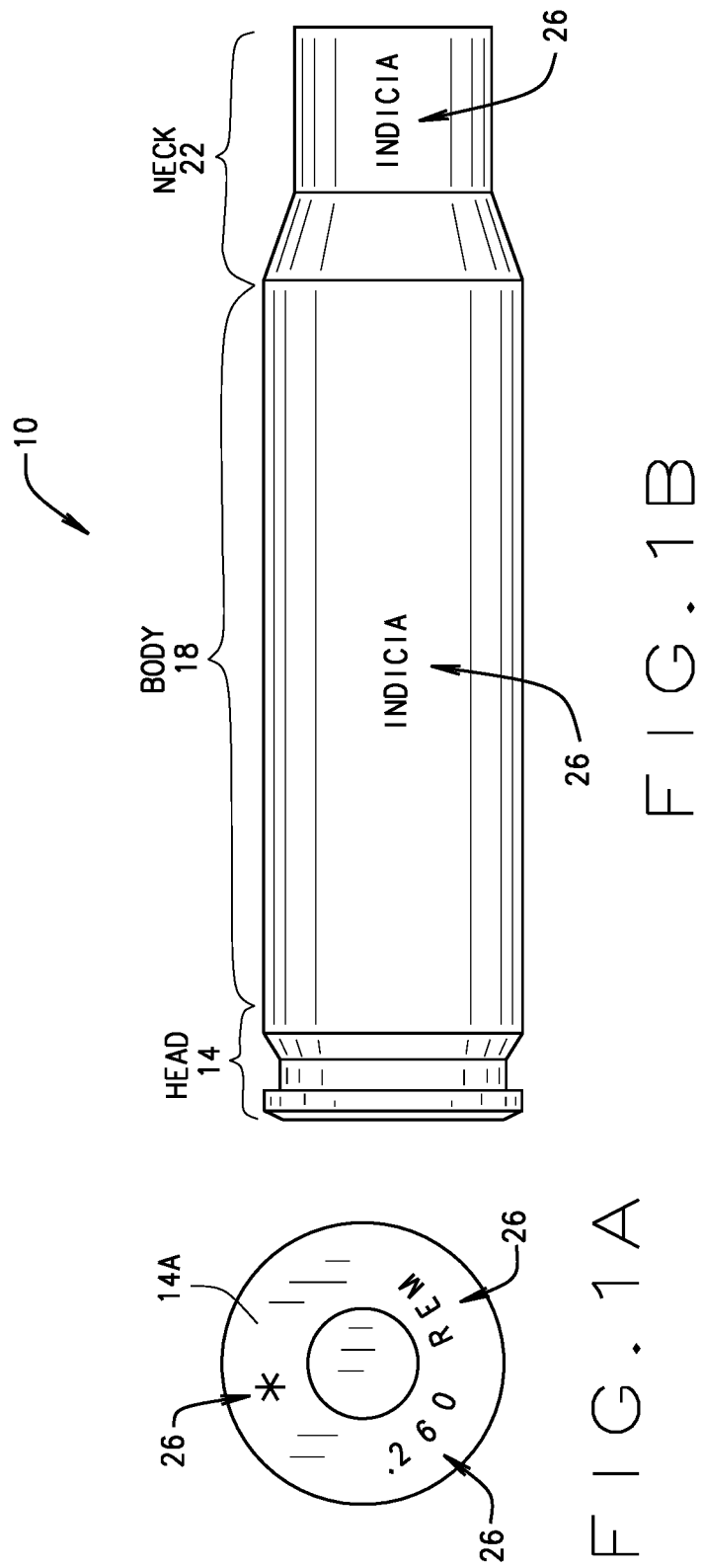

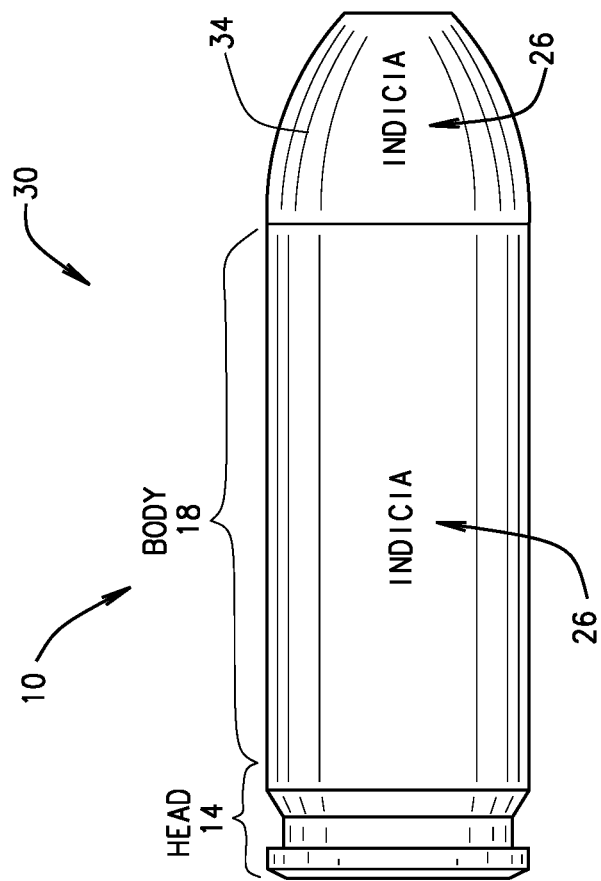
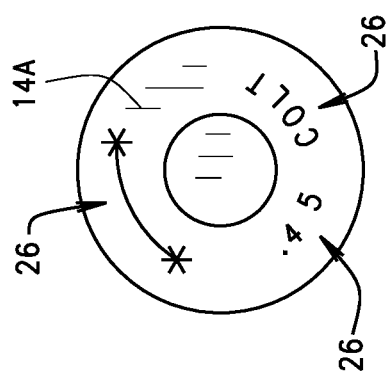

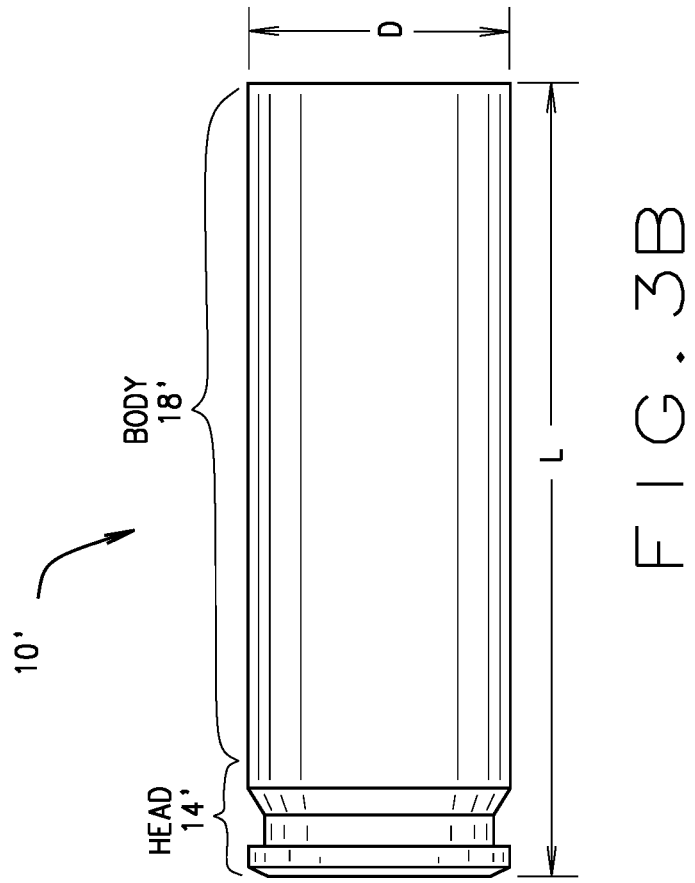
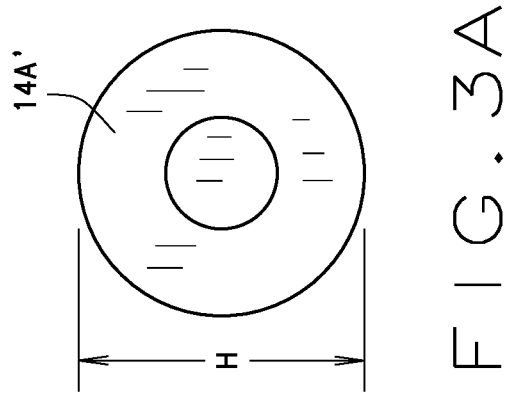

```
  ┌─ 102                                              ┌─ 100
  │  ┌────────────────────────────────────────────────────────────────┐
  └─▶│ FABRICATING A PLURALITY OF SUBSTANTIALLY IDENTICALLY SIZED     │
     │ AND SHAPED UNMARKED MULTICALIBER INVENTORY CASES SUITABLE FOR  │
     │ USE IN MANUFACTURING A PLURALITY OF DIFFERENT CALIBER CARTRIDGES│
     └────────────────────────────────────────────────────────────────┘
                                   │
  ┌─ 104  ┌───────────────────────▼────────────────────────────────┐
  │       │ SELECTING A NUMBER OF THE PLURALITY OF THE UNMARKED    │
  └──────▶│ INVENTORY CASES TO BE USED TO MANUFACTURING A SELECTED │
          │ ONE OF THE PLURALITY DIFFERENT CALIBER CARTRIDGES       │
          └────────────────────────────────────────────────────────┘
                                   │
  ┌─ 106  ┌───────────────────────▼────────────────────────────────┐
  │       │ INSCRIBING, VIA A LASER MARKING DEVICE, THE SELECTED   │
  │       │ NUMBER OF UNMARKED INVENTORY CASES WITH AT LEAST ONE   │
  └──────▶│ INSCRIPTION TO IDENTIFY AT LEAST THE CALIBER OF THE    │
          │ RESPECTIVE ONE OF DIFFERENT CALIBER CARTRIDGES THE     │
          │ SELECTED NUMBER OF UNMARKED INVENTORY CASES ARE TO BE  │
          │ USED TO MANUFACTURE                                     │
          └────────────────────────────────────────────────────────┘
```

FIG. 4

```
  ┌─ 202                                              ┌─ 200
  │  ┌────────────────────────────────────────────────────────────────┐
  └─▶│ FABRICATING A PLURALITY OF SUBSTANTIALLY IDENTICALLY SIZED     │
     │ AND SHAPED UNMARKED MULTICALIBER INVENTORY CASES SUITABLE FOR  │
     │ USE IN MANUFACTURING A PLURALITY OF DIFFERENT CALIBER CARTRIDGES│
     └────────────────────────────────────────────────────────────────┘
                                   │
  ┌─ 204  ┌───────────────────────▼────────────────────────────────┐
  └──────▶│ SELECTING A NUMBER OF THE PLURALITY OF THE UNMARKED    │
          │ INVENTORY CASES TO BE USED TO MANUFACTURING A SELECTED │
          │ ONE OF THE PLURALITY DIFFERENT CALIBER CARTRIDGES       │
          └────────────────────────────────────────────────────────┘
                                   │
  ┌─ 206  ┌───────────────────────▼────────────────────────────────┐
  └──────▶│ INSCRIBING, VIA A LASER MARKING DEVICE, THE SELECTED   │
          │ NUMBER OF UNMARKED INVENTORY CASES WITH AT LEAST ONE   │
          │ INSCRIPTION TO IDENTIFY AT LEAST THE CALIBER OF THE    │
          │ RESPECTIVE ONE OF DIFFERENT CALIBER CARTRIDGES THE     │
          │ SELECTED NUMBER OF UNMARKED INVENTORY CASES ARE TO BE  │
          │ USED TO MANUFACTURE                                     │
          └────────────────────────────────────────────────────────┘
                                   │
  ┌─ 208  ┌───────────────────────▼────────────────────────────┐
  └──────▶│ PRIMING THE SELECTED NUMBER OF MARKED CASES        │
          └────────────────────────────────────────────────────┘
                                   │
  ┌─ 210  ┌───────────────────────▼────────────────────────────────┐
  └──────▶│ LOADING AN AMOUNT OF PROPELLANT DESIRED FOR THE        │
          │ SELECTED ONE OF THE PLURALITY OF DIFFERENT CALIBER     │
          │ CARTRIDGES INTO THE SELECTING NUMBER OF MARKED CASES   │
          └────────────────────────────────────────────────────────┘
                                   │
  ┌─ 212  ┌───────────────────────▼────────────────────────────────┐
  └──────▶│ LOADING A PROJECTILE DESIRED FOR THE SELECTED ONE OF   │
          │ THE PLURALITY OF DIFFERENT CALIBER CARTRIDGES INTO THE │
          │ SELECTED NUMBER OF MARKED CASES                         │
          └────────────────────────────────────────────────────────┘
```

FIG. 5

METHOD OF MANUFACTURING A CARTRIDGE CASE

FIELD

The present teachings relate to cartridges (e.g., firearm cartridge), and more particularly to a method of manufacturing a cartridge case.

BACKGROUND

The statements in this section merely provide background information related to the present disclosure and may not constitute prior art.

As is known in the industry, cartridge manufactures (e.g., firearm cartridge manufactures) mass produce cartridge cases whereby, prior to completion of a heading step in the manufacturing process, the cases are suitable for use in the production of a plurality of cartridges (e.g., different caliber cartridges). However, for over a century, due to the requirement to mark the cases with the name of the cartridge case, which most often includes the caliber of projectile with which the case will be loaded and the name of the cartridge, as well as the name of the actual physical manufacturer making the cartridge case, known methods for manufacturing cartridge cases have forced manufacturers to mark the cases at this early stage in the manufacturing process. Particularly, all known manufacturing methods mark the cases during the heading process. The known method of marking the cases is by stamping an imprint into the base, or bottom, of the head of the case. Such stamping of the case must be done during the heading process due the material property changes that the heading process causes that cannot occur during the remaining steps in manufacturing the cases that are subsequent to the heading process. For example, the heading process permanently hardens the head forming the required grain structure. This keeps the cartridge case too hard to imprint in subsequent stages. Any annealing to permit the imprinting would destroy the structural integrity of the case, so after heading this part of the case is isolated from any exposure to any heat source in all known methods for manufacturing.

Hence, in order to have a ready supply of various cartridge cases, wherein each case be utilized to manufacture a plurality of different caliber cartridges, due to the production speeds and economic cost of stopping the line to change the bunter used in heading to imprint cartridge, manufacturers typically must produce (and often store) a significant amount (e.g., hundreds of thousands) of cases stamped and designated for each respective one of a plurality of different calibers. This leads to the manufacturing of headstamped cartridge cases for the vast plurality of different cartridge cases. Moreover, as manufacturing quantities are generally in the hundreds of thousands, at a minimum, with most manufacturers having production minimums in the millions for any cartridge case to be manufactured, this can lead to large material waste and financial losses when the demand for any particular caliber case is less than the supply of the manufactured and stored cases of the particular caliber.

Beyond the material waste this creates a significant barrier of entry with a cooling effect on innovation and invention. More concerning, many inventors, due to these economic constraints of the known manufacturing process, use cartridge cases that they have reformed to their own design, but that still have their original headstamp. This creates a potential public danger as these cases are not properly marked for what they have become and can cause, and have caused, catastrophic, even fatal, accidents due to mistaken identity. Further, to date, it has never been possible, with current or earlier manufacturing methods, to mark the side of the body, the shoulder, the neck or the projectile of a cartridge case.

SUMMARY

In various embodiment, the present disclosure provides a method of manufacturing cartridge cases, wherein the method comprises fabricating a plurality of substantially identically sized and shaped unmarked inventory cases suitable for use in manufacturing a plurality of different caliber cartridges and selecting a number of the plurality of the unmarked inventory cases to be used to manufacturing a selected one of the plurality different caliber cartridges. The method further comprises inscribing, via a laser inscription device, the selected number of unmarked inventory cases to identify at least the selected one of the plurality of different caliber cartridges the selected number of unmarked inventory cases are to be used to manufacture.

In various other embodiments, the present disclosure provides a method of manufacturing cartridges, wherein the method comprises: fabricating a plurality of substantially identically sized and shaped unmarked inventory cases suitable for use in manufacturing a plurality of different caliber cartridges. The method additionally includes selecting a number of the plurality of the unmarked inventory cases to be used to manufacturing a selected one of the plurality different caliber cartridges, and then inscribing, via a laser inscription device, the selected number of unmarked inventory cases to identify at least the selected one of the plurality of different caliber cartridges the selected number of unmarked inventory cases are to be used to manufacture. The method further comprises priming the selected number of inscribed cases, loading an amount of propellant desired for the selected one of the plurality of different caliber cartridges into the selecting number of inscribed cases, and loading a projectile desired for the selected one of the plurality of different caliber cartridges into the selected number of inscribed cases.

In yet other various embodiments, the present disclosure provides a cartridge case, wherein the case comprises a head, a body, and a laser inscription on at least one of the head and the body identifying at least a caliber of the cartridge of which the case is a component thereof or the case is to be used to manufacture.

Moreover, the present disclosure provides the opportunity to clearly describe the case in easily legible writing, more easily read by those with visual impairments, Also, marking the body of the case and/or the projectile provides the capacity to utilize universal non-language based symbols, indicating for example, that dangerous materials, e.g., uranium, are present.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 1A is an exemplary rear view of a head of a cartridge case (e.g., a firearm cartridge case) having a laser etched marking, in accordance with various embodiments of the present disclosure.

FIG. 1B is a side view of the cartridge case shown in FIG. 1A, having additional indicia laser etched into a body of the cartridge, in accordance with various embodiments of the present disclosure.

FIG. 2A is an exemplary rear view of a head of a loaded cartridge having a laser etched marking, in accordance with various embodiments of the present disclosure.

FIG. 2B is a side view of the cartridge shown in FIG. 2A, having additional indicia laser etched into a body and/or a projectile of the cartridge, in accordance with various embodiments of the present disclosure.

FIG. 3A is an exemplary rear view of a head of an unmarked multicaliber inventory case, in accordance with various embodiments of the present disclosure.

FIG. 3B is a side view of the unmarked multicaliber inventory case shown in FIG. 3A, in accordance with various embodiments of the present disclosure.

FIG. 4 is flow chart illustrating a method of manufacturing a cartridge case, in accordance with various embodiments of the present disclosure.

FIG. 5 is flow chart illustrating a method of manufacturing a cartridge (e.g., a firearm cartridge), in accordance with various embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts are causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc., can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Referring now to FIGS. 1A, 1B, 2A and 2B, in various embodiments, the present disclosure provides a cartridge case 10 (e.g., a firearm cartridge case) having information and/or other indicia laser etched, cut, burned or otherwise laser inscribed or laser marked thereon. That is, the information and/or other indicia is inscribed on the case using a laser etching, cutting or burning device, or other laser inscription or engraving device, machine or printer. The case 10 can be fabricated from a metal such as steel, brass, copper, aluminum, zinc, titanium or alloys thereof. More specifically, in various embodiments the case 10 is fabricated by working (e.g., machine pressing, stamping and drawing) a metal coin (e.g., a piece of metal having a desired weight and mass, and shaped to resemble a coin) to form the case 10 having a desired diameter, length and shape. In various instances, the case 10 can be fabricate (e.g., molded) of a plastic or other composite material.

The case 10 generally comprises a head section 14 (simply referred to herein as the head 14) and a body section 18 extending from the head 14 (simply referred to herein as the body 18). In various instances, as exemplarily illustrated in FIG. 2B, the case 10 can additionally comprise a neck section 22 extending from the body 18 (simply referred to herein as the neck 22). The case 10 comprises one or more laser inscription 26 inscribed or otherwise durably inscribed or marked on the head 14 and/or the body 18 and/or the neck 22 utilizing a laser a laser etching, cutting or burning device, or other laser inscription or engraving device, machine or printer. As used herein the term durably inscribed will be understood to mean that the laser inscription(s) 26 is/are laser etched, cut or burned into the case 10 such that the laser inscription(s) 26 will meet the cartridge case marking requirements of a durable mark as set by the Sporting Arms & Ammunition Manufactures Institute (SAAMI) standardization board.

The laser inscription(s) 26 can comprise any desired information or indicia. For example, in various embodiments, the laser inscription(s) 26 can comprise the name of the cartridge which usually includes the name and caliber of the cartridge the case 10 is intended to be used to manufacture (e.g., the caliber of the cartridge for which the case is intended to be a component thereof), or any other desired indicia or information such as: the name of the manufacturer of the case 10, or the name of the company or individual who contracted to have the case made; a trademark; dated of manufacture; a serial number; a tracking code; a bar code; a QR code; any desired design, image or picture; any desired text such as a slogan, verse or saying; and/or any other desired data. As indicated in FIGS. 1A, 1B, 2A and 2B, the laser inscription(s) 26 can be inscribed on any portion or part of the case 10. For example, case 10 can comprise the name, caliber and case manufacturer laser inscribed on a bottom 14A of the head 14. Alternatively, or additionally, the name, caliber and manufacture can be laser inscribed on the body 18 and/or on the neck 22. Furthermore, for example, the case 10 can comprise any other indicia laser inscribed on the head bottom 14A and/or on the body 18 and/or on the neck 22.

Referring now to FIGS. 1A, 1B, 2A, 2C, 3A and 3B, as described below, in various embodiments, the case 10 can be fabricated or manufactured to initially be an unmarked inventory case 10' that is suitable for use in fabricating or manufacturing a plurality of different caliber cartridges (e.g., a unmarked multicaliber inventory case). Therefore, the unmarked multicaliber inventory case 10' can be fabricated or manufactured absent any intentional markings, and held or stored in inventory as such until it is determined which of the plurality of possible caliber cartridges the unmarked multicaliber inventory case 10' is to be used to manufacture. Then, thereafter the unmarked multicaliber inventory case 10' can have the laser inscription(s) 26 (e.g., the name, caliber and case manufacturer) laser etched, cut, burned or otherwise laser inscribed or laser marked on the head bottom 14A' and/or body 18' and/or neck 22'. Furthermore, in various embodiments, the unmarked multicaliber inventory case 10' can be one of a plurality (e.g., hundreds of thousand or millions) of unmarked multicaliber inventory cases 10' that are absent any intentional markings and stored as inventory until any number of the unmarked multicaliber inventory cases 10' are designated for use in manufacturing a plurality of particular caliber cartridges. Whereafter, the plurality of unmarked multicaliber inventory cases 10' can have the laser inscription(s) 26 (e.g., the name, caliber and case manufacturer) laser etched, cut, burned or otherwise laser inscribed or laser marked on the head bottoms 14A' and/or bodies 18' and/or necks 22'.

Referring now to FIGS. 2A, and 2B, in various embodiments, the case 10 can be a component of cartridge 30 (e.g., a firearm cartridge). In such embodiments, the cartridge 30 comprises the case 10 (or, in various instances unmarked multicaliber inventory cases 10') primed (i.e., has a primer installed) and loaded with propellant (e.g., filled with a measured amount of smokeless propellant or black powder), and a projectile 34 (e.g., bullet) pressed into the case 10/10'. It is envisioned that in such embodiments, the projectile 34 can also include one or more laser inscription 26 that is laser etched, cut, burned or otherwise laser inscribed or laser marked on any portion of the projectile 34. In such instances, the laser inscription(s) 26 can be laser etched, cut, burned or otherwise laser inscribed or laser marked on the projectile 34 before or after the projectile 34 is pressed into the case 10.

Referring now to FIGS. 1A, 1B, 2A, 2C, 3A, 3B, and 4, as described above, in various embodiments, the present disclosure provides a method for manufacturing one or more cartridge cases 10 (e.g., firearm cartridge cases). For exemplary purposes, FIG. 4 provides a flow chart 100 illustrating a method for manufacturing a plurality of cartridge cases 10. The method comprises fabricating a plurality of substantially identically sized and shaped unmarked multicaliber inventory cases 10' (e.g., tens of thousands, hundreds of thousands or millions of unmarked multicaliber inventory cases 10') suitable for use in manufacturing a plurality of different caliber cartridges, as indicated at 102. That is, a plurality of unmarked multicaliber inventory cases 10' are fabricated such that they can be interchangeably used to manufacture a plurality of different caliber cartridges that use cases having substantially the same shape and diameter.

For example, the 223 case family includes cartridges that are generally loaded with, but not limited to, projectiles having a diameter of 0.172, 0.224, 0.243, 0.257, 0.264, 0.277, 0.284, 0.308, 0.323, and 0.338 all of which utilize cases having substantially the same shape and diameter (only the length may differ) such that the 223 cases (e.g., the multicaliber inventory cases 10') can be interchangeably used to accommodate at least any of the above listed projectiles. Generally, the limiting factor in a case projectile capacity is the diameter of the body at the neck of the proposed cartridge case, minus the minimum thickness of the neck as proposed by the designer, generally approximately 20 thousandths of an inch, plus or minus a few thousandths for smaller diameter projectiles up to 30 thousandths of an inch or more for larger diameter projectiles in small arms cartridge cases. Other similar examples can be found in the 308 case family of cartridges, and 30-06 case family of cartridges, (both of similar head and body dimensions, but with different overall lengths) among others where cartridges have been designed that can be generally loaded with, but not limited to, projectiles of having a diameter of 0.172, 0.224, 0.243, 0.257, 0.264, 0.277, 0.284, 0.308, 0.323, 0.338, 0.348, 0.358, 0.375, 0.408, 0.416, 0.429, 0.458 all of which utilize cases having substantially the same shape and diameter (only the length may differ), whereby such multicaliber inventory cases 10' can be interchangeably used to accommodate at least any of the above listed projectiles. Again, the limiting factor is the diameter of the body at the neck of the proposed cartridge case, minus the minimum thickness of the neck as proposed by the designer. This principle would apply to any cartridge case family of any head and body size.

In various instances, the unmarked multicaliber inventory cases 10') can be fabricated by working (e.g., machine pressing, stamping and drawing) a plurality of metal coins (e.g., copper-zinc blended coins) to form the plurality of unmarked multicaliber inventory cases 10' having substantially the identical size and shape. Importantly, each of the plurality of unmarked multicaliber inventory cases 10' comprises the head 14' with no intentional markings or indicia thereon, and the body 18' with no intentional markings or indicia thereon. In various instances, each of the plurality of unmarked multicaliber inventory cases 10' can include the neck 22' with no intentional markings are indicia thereon, while in other instances, the plurality of unmarked multicaliber inventory cases 10' do not include the neck 22'.

The unmarked heads 14' of the unmarked multicaliber inventory cases 10' are sized and shaped to be suitable for use in manufacturing the plurality of different caliber cartridges that can interchangeably utilize substantially the same case (only the length may differ). Particularly, in various embodiments, the heads 14' have an inventory diameter H that is equal to or greater than the longest/largest head diameter needed for manufacturing the one of the plurality of different caliber cartridges having that same head diameter. For example, if the unmarked multicaliber inventory cases 10' are suitable for use in manufacturing 223 case family cartridges, which includes cartridges that are generally loaded with, but not limited to, projectiles having a diameter of 0.172, 0.224, 0.243, 0.257, 0.264, 0.277, 0.284, 0.308, 0.323, and 0.338, the inventory head diameter H would be at least as long/large as (or longer/larger than) the diameter of the case 10' for whichever of the cases with projectiles having a diameter of 0.172, 0.224, 0.243, 0.257, 0.264, 0.277, 0.284, 0.308, 0.323 and 0.338 that requires the largest/longest head diameter. Or, for example, if the unmarked multicaliber inventory cases 10' are suitable for use in manufacturing 308 case family cartridges, or the 30.06 case family cartridges, the inventory head diameter H would be at least as long/large as (or longer/larger than) the diameter of the case 10' for whichever of the 308 case family cartridges or the 30-06 caliber cartridge requires the longest/largest head diameter.

In various embodiments, the bodies 18' of the unmarked multicaliber inventory cases 10' have a diameter D suitable for use in manufacturing the plurality of different caliber cartridges that can interchangeably utilize substantially the same case (only the length may differ). Additionally, the bodies 18' have an inventory length L that is equal to or greater than the longest length needed for manufacturing the one of the plurality of different caliber cartridges having the longest case length. For example, if the unmarked multicaliber inventory cases 10' are suitable for use in manufacturing 223 case family cartridges 223, the case family includes cartridges that are generally loaded with, but not limited to, projectiles of having a diameter of 0.172, 0.224, 0.243, 0.257, 0.264, 0.277, 0.284, 0.308, 0.323, and 0.338, the inventory length L would be at least as long as (or longer than) the length of the case 10' for whichever of the cases with projectiles of having a diameter of 0.172, 0.224, 0.243, 0.257, 0.264, 0.277, 0.284, 0.308, 0.323 and 0.338 that requires the longest case. Or, for example, if the unmarked multicaliber inventory cases 10' are suitable for use in manufacturing 308 case family cartridges, or the 30-06 case family cartridges, the inventory length L would be at least as long as (or longer than) the length of the case 10' for whichever of the 308 case family cartridges, or the 30-06 case family cartridges, requires the longest case.

Once the plurality of unmarked multicaliber inventory cases 10' (e.g., tens of thousands, hundreds of thousands or millions of unmarked multicaliber inventory cases 10') have been fabricated, they can be stored as unmarked multicaliber inventory.

Once the plurality of unmarked multicaliber inventory cases 10' are fabricated (and in various instances stored as inventory), the method for manufacturing one or more cartridge cases 10 further comprises selecting a number of the plurality of the unmarked inventory cases 10' to be used to manufacturing a selected one of the plurality different caliber cartridges, as indicated at 104. For example, plurality of unmarked multicaliber inventory cases 10' can be stored in inventory until it is desired to utilize a portion (or all) of the stored unmarked multicaliber inventory cases 10' for manufacturing one of the plurality of cartridges for which the respective unmarked multicaliber inventory cases 10' can be utilized. For example, if 50,000 unmarked multicaliber inventory cases 10' suitable to be interchangeably used to manufacture 223 case family cartridges are fabricated (as described herein) and stored as inventory, and one or more company, individual or other manufacturer places an order for 25,000 of a specific cartridge in the 223 case family with 0.257 diameter projectiles and 10,000 of another different specific cartridge in the 223 case family with 0.227 diameter projectiles, 25,000 of the 50,000 stored multicaliber inventory cases 10' will be taken out of inventory for inscribing and finishing (as described further below) to be suitable for use in manufacturing the respective specific cartridge with the 0.257 diameter projectile, and 10,000 of the same 50,000 stored unmarked multicaliber inventory cases 10' will be taken out of inventory for inscribing and finishing (as described further below) to be suitable for use in manufacturing the respective specific cartridge with the 0.277 diameter projectile.

After the plurality of unmarked inventory cases 10' are selected for use in manufacturing a selected one of the plurality different caliber cartridges the method for manufacturing one or more cartridge cases 10 further comprises inscribing, via a laser marking device, the selected number of unmarked inventory cases 10' with at least one inscription 26 to identify at least the name, caliber, or date of manufacture of the respective one of the plurality of different caliber cartridges the selected number of unmarked inventory cases are to be used to manufacture, as indicated at 106. As described above, the laser inscription(s) 26 can comprise any desired information or indicia. For example, in various embodiments, the laser inscription(s) 26 can comprise the caliber of the cartridge the cases 10' areas intended to be used to manufacture (e.g., the caliber of the cartridge for which the cases 10' are intended to be a component thereof, or any other desired information or indicia such as: the name of the case manufacturer, the name of the company, person or other manufactures that the case 10 will be used to manufacture a cartridge for; a trademark; date of manufacture; a serial number; a tracking code; a bar code; a QR code; any desired design, image or picture; any desired text such as a slogan, verse or saying; and/or any other desired data. The laser inscription(s) 26 can be inscribed on any portion or part of the unmarked multicaliber inventory cases 10'. For example, the name, caliber and/or case manufacture can be laser inscribed on the bottom 14A' of the head 14'. Alternatively, or additionally, the caliber and gun manufacture can be laser inscribed on the body 18' and/or on the neck 22'. Furthermore, for example, any other indicia laser inscribed on the head bottom 14A' and/or on the body 18' and/or on the neck 22' of the unmarked multicaliber inventory cases 10'. The information, data and/or any other indicia 26 can be inscribed on the unmarked multicaliber inventory cases 10' using any suitable laser etching, cutting or burning device, or other laser inscription or engraving device, machine or printer (e.g., a UV laser, $CO_2$ laser, Hybrid laser with 1, 2 or 3 axis arraignment).

As described above, after a desired number of the fabricated unmarked multicaliber inventory cases 10' are selected to be used for manufacturing one of the respective different caliber cartridges the cases 10' can be interchangeably used to manufacture, in various embodiments, the selected number of cases 10' will need to be finished (e.g., head trimmed and/or length trimmed and/or necked) such that the cases 10' have the proper geometry, dimensions, size and shape for use in manufacturing respective caliber cartridges. In such embodiments, the method for manufacturing one or more cartridge cases 10 further comprises finishing the cases 10' by performing or completing one or more of: 1) turning or trimming the heads 14' to reduce the inventory diameter H such that the heads 14' have the correct rim diameter for use in manufacturing respective caliber cartridges; 2) trimming the length of the bodies 18' to reduce the inventory L such that the bodies 18' have the corrected body length for use in manufacturing respective caliber cartridges; and 3) necking the bodies 18' to provide the cases 10' with correct neck profile, size, shape and geometry for use in manufacturing respective caliber cartridges.

It is envisioned that, in various embodiments, the step of inscribing, via a laser marking device, the selected number of unmarked inventory cases 10' with at least one inscription 26 to identify at least the name, caliber, or date of manufacture of the respective one of the plurality of different caliber cartridges the selected number of unmarked inventory cases are to be used to manufacture can be performed and completed prior to, or subsequent to, finishing (e.g., head trimming and/or length trimming and/or necking) the selected number of unmarked inventory cases 10'. It is further envisioned that, in various embodiments, the unmarked multicaliber inventory cases 10' can be inscribed with the caliber or other desired information or indicia prior to, or subsequent to, selecting a number of the plurality of the unmarked inventory cases 10' to be used to manufacturing the selected one of the plurality different caliber cartridges.

Referring now to FIGS. 1A, 1B, 2A, 2C, 3A, 3B, and 5, in various embodiments the present disclosure provides a method for manufacturing one or more loaded cartridge 30. For exemplary purposes, FIG. 5 provides a flow chart 200 illustrating a method for manufacturing the loaded cartridge 30. As indicated at 202, the method comprises fabricating a plurality of substantially identically sized and shaped unmarked multicaliber inventory cases 10' as described above with regard to at least 102 of flow chart 100. Once the plurality of unmarked multicaliber inventory cases 10' are fabricated (and in various instances stored as inventory), as indicated at 204, the method for manufacturing the loaded cartridge 30 further comprises selecting a number of the plurality of the unmarked inventory cases 10' to be used to manufacturing a selected one of the plurality different caliber cartridges, as described above with regard to at least 104 of flow chart 100. After the plurality of unmarked inventory cases 10' are selected for use in manufacturing a selected one of the plurality different caliber cartridges, as indicated at 206, the method for manufacturing the loaded cartridge 30 further comprises inscribing, via a laser marking device, the selected number of unmarked inventory cases 10' with at least one inscription 26 to identify at least the name, caliber, or date of manufacture of the respective one of the plurality of different caliber cartridges the selected number of unmarked inventory cases are to be used to manufacture, as described above with regard to at least 106 of flow chart 100.

As described above with regard to flow chart 100, after a desired number of the fabricated unmarked multicaliber inventory cases 10' are selected to be used for manufacturing one of the respective different caliber cartridges the cases 10' can be interchangeably used to manufacture, in various embodiments, the selected number of cases 10' will need to be finished (e.g., head trimmed and/or length trimmed and/or necked) such that the cases 10' have the proper geometry, dimensions, size and shape for use in manufacturing respective caliber cartridges. In such embodiments, the method for manufacturing one or more cartridge cases 10 further comprises finishing the cases 10' by performing or completing one or more of: 1) turning or trimming the heads 14' to reduce the inventory diameter H such that the heads 14' have the correct rim diameter for use in manufacturing respective caliber cartridges; 2) trimming the length of the bodies 18' to reduce the inventory L such that the bodies 18' have the corrected body length for use in manufacturing respective caliber cartridges; and 3) necking the bodies 18' to provide the cases 10' with correct neck profile, size, shape and geometry for use in manufacturing respective caliber cartridges.

It is envisioned that, in various embodiments, the step of inscribing, via a laser marking device, the selected number of unmarked inventory cases 10' with at least one inscription 26 to identify at least the name, caliber, or date of manufacture of the respective one of the plurality of different caliber cartridges the selected number of unmarked inventory cases are to be used to manufacture can be performed and completed prior to, or subsequent to, finishing (e.g., head trimming and/or length trimming and/or necking) the selected number of unmarked inventory cases 10'. It is further envisioned that, in various embodiments, the unmarked multicaliber inventory cases 10' can be inscribed with the caliber or other desired information or indicia prior to, or subsequent to, selecting a number of the plurality of the unmarked inventory cases 10' to be used to manufacturing the selected one of the plurality different caliber cartridges.

Additionally, is indicated at 208, the method for manufacturing the cartridge 30 further comprises priming the selected number of marked cases 10 by inserting a primer into the bases 14, or otherwise priming the case 10 through injection of priming compound into the case (e.g., as is done with rimfire cases). Furthermore, as indicated at 210 and 212, the method for manufacturing the cartridge 30 comprises loading an amount of propellant (e.g., gun powder) desired for the respective caliber cartridge 30 into the selected number of marked cases 10 and loading, or pressing, the projectiles 34 desired for the respective caliber cartridge into the selected number of marked cases 10. Although it has been described above that the selected number of unmarked inventory cases 10' are laser inscribed prior to priming and loading the propellant and projectile 34, it is envisioned that, in various embodiments, the cartridge 30 can be laser inscribed after the cases 10' have been primed and/or loaded with the propellant and projectile 34. Testing has shown that the laser inscribing of the cases 10' subsequent to priming and loading the propellant and projectile 34 does not generate heat sufficient to ignite the compound in the primer, nor the loaded propellant in the case.

In various embodiments, the method for manufacturing the cartridge 30 can further comprise laser inscribing the projectile 34 with indicia 26, prior to or subsequent to loading, or pressing, the projectile 34 into the cases 10/10'

Although it has been described above that the unmarked inventory cases 10' and/or projectiles 34 are generally laser inscribed during a single step of the methods described above, it is envisioned that in various embodiments, the unmarked inventory cases 10' and/or the projectiles 34 can be laser inscribed, as described above, at more than one point or step of the methods described above and remain within the scope of the present disclosure. For example, the unmarked inventory cases 10' can be laser inscribed with certain indicia 26 (e.g., a particular caliber) after the cases 10' have been fabricated and prior to be stored as inventory, then they can be laser inscribed with other indicia 26 (e.g., a company name) after a number or group of the cases 10' have been selected for use in fabricating the cartridges 30 and before finishing the cases 10', and/or after finishing the cases 10', and/or in various instances laser inscribed with yet other indicia 26 (e.g. a QR code) after the cases 10 have been primed and/or loaded with propellant and the projectile 34.

The present disclosure illustrates that it is possible to use a laser to make the appropriate (and required), durable markings on the head of a cartridge case using a laser, instead of known mechanical means. Further illustrated in the present disclosure, it that it is possible to put durable markings along the body of the cartridge case and on the projectiles (bullets). The marking methods described herein are not obvious as cartridge cases are primarily made of brass that must be worked under pressure to generate the proper grain structure and hardness in the cartridge case. The grain structure and hardness in a cartridge case varies going from the hardest and smallest grain structures in the head to the softer and larger grain structures in the body. Hence, generally heat of any kind can cause the case to weaken drastically by causing the grains to reconsolidate and the brass to soften. This is likely the reason that nothing like method disclosed herein has ever been contemplated previously as the use of a heat source on brass that has reached its final hardness is counter intuitive. However, the laser application process described herein can be done quickly enough as to prevent any meaningful conduction of the heat and most all the heat is expelled by the particles burned from the surface as they are vaporized by the laser. The same is true for markings made on the body and on projectiles. Testing demonstrated nominal temperature increases in the remaining brass of the cartridge case, yet the mark was found to be durable, in accordance with the standard set by SAAMI, such that the markings did not come off when the case were exposed to mild abrasion or retained in storage, nor after the cartridge had been loaded and discharged. In fact, test results show such a nominal temperature impact from the laser marking process that it is possible to mark loaded cases without causing detonating of the propellant or priming compounds. While it is unlikely that marking of the head would be left until after loading, it is conceivable that the new ability to mark the body could be done after loading.

The marking methods described herein will allow for significant, revolutionary and unprecedented changes to current manufacturing methods. Companies can now react more swiftly by manufacturing basic unmarked cases in the different case families and warehousing the unmarked cases instead of holding cups on the other side of the most manufacturing intensive deep draw processes that occur prior to heading. This will also speed up the heading process as the lengthy process to change heading dies to adjust the information imprinted on the head will no longer be needed, plus the parts of the heading dies most prone to wear down or crack, e.g., the lettering on the heading dies, can be removed. This will provide more output from the heading machines. The laser marking methods disclosed herein can be done at any point in the manufacturing process up to, and after, loading. One skilled in the art would readily recognize that any physical marking of the case after the heading process would be new. For example, as exemplarily described above, laser marking any part of the case after the heading process is new and novel.

Additionally, one skilled in the art would readily recognize that marking the body has never been done before due to the thinness of the brass sidewalls of the case body. The known mechanical marking processes have never been adapted, and are not suitable to be adapted, to marking such thin and soft brass as the sidewall of a cartridge case. However, the methods described herein open up the potential to mark the sidewall of the case for such things as easier reading of the cartridge designation, tracking loading dates, identifying manufacturing points of origin, serializing the cases, commemorative markings, advertisement markings, safety warnings, labeling proof ammunition, providing load information, and providing any other desired information.

As mentioned earlier, projectiles (bullets) have never been marked with by a laser as described herein. Rather, projectiles have usually been coded with paints or dies to indicate some type of a projectile, usually for military designation and use, or to designate the projectiles for proof testing. Such coding methods require knowledge of the particular coding system and the original purchaser to make sure the color code being used to decode the markings is the correct one. Utilizing the marking methods described herein, It is now possible to label projectiles with clear markings to avoid confusion and prevent potentially dangerous situations, or worse. Such methods will further prevent the accidental or undetected release of military grade ammunition into commercial sale.

Furthermore, the increased ability to mark cases on the head and the side with a laser brings new opportunities, such as the ability to add QR codes and bar codes to cases, thereby providing encoded information on individual cartridge cases that has never been achieved before. The value of this is two-fold. First, civilian markets can now find data on their cartridge cases that allow for all the opportunities that tracking marking methods via smart phones, etc., can provide and permits certain regulatory tracking that was previously impossible. Second, for military markets, this allows for a new level of tracking as far as date and point of manufacture that has never been possible. Tracking can be absolute. Still further, for forensic purposes, both civilian and military, the source and use of the ammunition can now be tracked. Civilian law enforcement can potentially gain new insights into the sources from which criminal elements are obtaining their ammunition, and militaries can track the usage of their own ammunition, even if stolen and used by the opposition.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A method of manufacturing cartridge cases, said method comprising:
    fabricating a plurality of substantially identically sized and shaped unmarked inventory cases suitable for use in manufacturing a plurality of different caliber cartridges, wherein each substantially identically sized and shaped unmarked inventory case has a round surface and wherein each substantially identically sized and shaped unmarked inventory case has a head of substantially the same shape and diameter and a body of substantially the same shape and length, wherein each head has a size and a shape suitable for manufacturing the plurality of different caliber cartridges, wherein each body has a diameter suitable for manufacturing the plurality of different caliber cartridges and an inventory length equal to or greater than the longest length needed for manufacturing the one of the plurality of different caliber cartridges;
    at least one of trimming and of necking the selected number of unmarked inventory cases such that the bodies of the selected number of unmarked inventory cases have a size and a shape for manufacturing the selected one of the plurality of different caliber cartridges;
    selecting a number of the plurality of the unmarked inventory cases to be used for manufacturing a selected one of the plurality different caliber cartridges; and
    inscribing, via a laser inscription device, the selected number of unmarked inventory cases upon their round surface to identify at least the selected one of the plurality of different caliber cartridges the selected number of unmarked inventory cases are to be used to manufacture, said inscribing removing material of one of said cartridges along a path made by said laser inscription device, and wherein said inscribing generates insufficient heat to compromise the structure of said cartridges and to ignite said cartridges.

2. The method of claim 1 further comprising turning the heads of the selected number of unmarked inventory cases about an axis parallel to the length of each of said cases such that the heads of the selected number of unmarked inventory cases are sized and shaped for use in manufacturing the selected one of the plurality of different caliber cartridges.

3. The method of claim 1, wherein inscribing, via a laser inscription device, the selected number of unmarked inventory cases comprises inscribing a body of each of the selected number of unmarked inventory cases with additional indicia that differs from the selected one of the plurality of different caliber cartridges the selected number of unmarked inventory cases are to be used to manufacture, wherein said additional indicia includes one or more of a name, a trademark, a date of manufacture, a serial number, a tracking code, a bar code, a QR code, an image, and a picture.

4. A method of manufacturing cartridges, said method comprising:
    fabricating a plurality of substantially identically sized and shaped unmarked uncoated inventory cases suitable for use in manufacturing a plurality of different caliber cartridges wherein each substantially identically sized and shaped unmarked uncoated inventory case has a round surface and wherein each substantially identically sized and shaped unmarked uncoated inventory case has a head of substantially the same shape and diameter and a body of substantially the same shape and length, wherein each head has a size and a shape suitable for manufacturing the plurality of different caliber cartridges, wherein each body has a diameter suitable for manufacturing the plurality of different caliber cartridges and an inventory length equal to or greater than the longest length needed for manufacturing the one of the plurality of different caliber cartridges;
    at least one of trimming and of necking the selected number of unmarked uncoated inventory cases such that the bodies of the selected number of unmarked uncoated inventory cases have a size and a shape for manufacturing the selected one of the plurality of different caliber cartridges;
    selecting a number of the plurality of the unmarked uncoated inventory cases to be used for manufacturing a selected one of the plurality different caliber cartridges;
    inscribing, via a laser inscription device, the selected number of unmarked uncoated inventory cases upon their round surface to identify at least the selected one of the plurality of different caliber cartridges the selected number of unmarked uncoated inventory cases are to be used to manufacture, said inscribing removing material of one of said cartridges along a path made by said laser inscription device, and wherein said inscribing generates insufficient heat to compromise the structure of said cartridges and to ignite said cartridges;
    priming the selected number of inscribed cases;
    loading an amount of propellant desired for the selected one of the plurality of different caliber cartridges into the selecting number of inscribed cases; and
    loading a projectile desired for the selected one of the plurality of different caliber cartridges into the selected number of inscribed cases.

5. The method of claim 4 further comprising turning the heads of the selected number of unmarked uncoated inventory cases about an axis parallel to the length of each of said cases such that the heads of the selected number of unmarked uncoated inventory cases are sized and shaped for use in manufacturing the selected one of the plurality of different caliber cartridges.

6. The method of claim 4, wherein inscribing, via a laser inscription device, the selected number of unmarked uncoated inventory cases comprises inscribing a body of each of the selected number of unmarked uncoated inventory cases with additional indicia that differs from the selected one of the plurality of different caliber cartridges the selected number of unmarked uncoated inventory cases are to be used to manufacture, wherein said additional indicia includes one or more of a name, a trademark, a date of manufacture, a serial number, a tracking code, a bar code, a QR code, an image, and a picture.

7. The method of claim 4 further comprising inscribing, via the laser inscription device, each uncoated projectile at least one of prior to or subsequent to loading each projectile into the selected number of marked cases.

\* \* \* \* \*